United States Patent [19]

Taj

[11] 4,032,205

[45] June 28, 1977

[54] ADAPTOR FOR A HIGH VOLTAGE CABLE

[75] Inventor: Hatim H. Taj, Waukesha, Wis.

[73] Assignee: RTE Corporation, Waukesha, Wis.

[22] Filed: Sept. 10, 1976

[21] Appl. No.: 722,009

[52] U.S. Cl. .............................. 339/13; 339/14 L; 339/61 R; 339/251

[51] Int. Cl.² ........................................ H01R 15/00

[58] Field of Search ......... 339/13, 22 R, 201, 61 R, 339/61 C, 203, 213 R, 258 R, 258 RR, 14 L, 251

[56] References Cited

UNITED STATES PATENTS

| 2,869,095 | 1/1959 | Arson | 339/61 R |
| 3,376,540 | 4/1968 | Turban | 339/201 X |
| 3,777,050 | 12/1973 | Silva | 339/251 X |

Primary Examiner—Roy Lake
Assistant Examiner—DeWalden W. Jones
Attorney, Agent, or Firm—Ronald E. Barry

[57] ABSTRACT

A ground contact adaptor for a high voltage cable having a metallic tape shield, the adaptor including a contact sleeve assembly having an electrically conductive band connected to a copper braid partially embedded within a conducting rubber contact sleeve and extending outwardly therefrom to form a ground contact, a spring biasing the band into electrical engagement with the metallic tape shield of the high voltage cable and a conducting rubber sleeve sealingly engaging the contact sleeve and cable insulation to form a water-tight seal around the band.

13 Claims, 3 Drawing Figures

ADAPTOR FOR A HIGH VOLTAGE CABLE

BACKGROUND OF THE INVENTION

When a high voltage cable having a metallic tape shield is spliced or terminated, the metallic type shield must be electrically connected to the system ground either by connection to the metallic tape shield of a second cable in a splice or to ground on cable termination. The connection to the metallic tape shield has to be sealed and must be capable of withstanding short circuit currents. The conventional method of making a ground connection to the metallic tape shield is by soldering a conductive braid or strip to the metallic tape shield. The connection is then sealed by wrapping conductive rubber tape and/or vinyl tape around the connection. Another type of ground contact includes an adaptor having a corrugated conductive strip enclosed within a molded rubber sleeve which is mounted on the metallic tape shield. A hose clamp is mounted on the rubber sleeve to squeeze the copper strip to the shield.

SUMMARY OF THE INVENTION

The ground contact adaptor of the present invention provides a simple compact method for connecting the metallic tape shield of a high voltage cable to ground. The ground contact adaptor is used for terminating a cable which is being prepared to make a cable splice or termination. The adapator includes a conductive band having a length greater than the circumference of the metallic tape shield. The band is wrapped around the shield and retained thereon by a spring which allows the band to expand and contract with the shield. The band is connected to a copper braid or strip whhich is embedded within and extends outwardly from a conducting rubber sleeve to provide an external connection for ground. The connection to the metallic tape shield is enclosed within a second conducting rubber sleeve to provide a water-tight seal around the connection. In the present state of the art, where a corrugated copper strip is used as the ground contact means, the contact pressure is concentrated over a part of the circumference of the copper tape shield. The concentrated pressure tends to deform the underlying cable insulation which is of a plastic material. This is specially true when the cabe is warm due to the load current. In the ground contact adaptor of the present invention the use of a copper band biased by a spring overcomes this disadvantage by distributing the force uniformly over the entire circumference of the copper tape shield.

DRAWINGS

DESCRIPTION OF THE INVENTION

Figure 2:
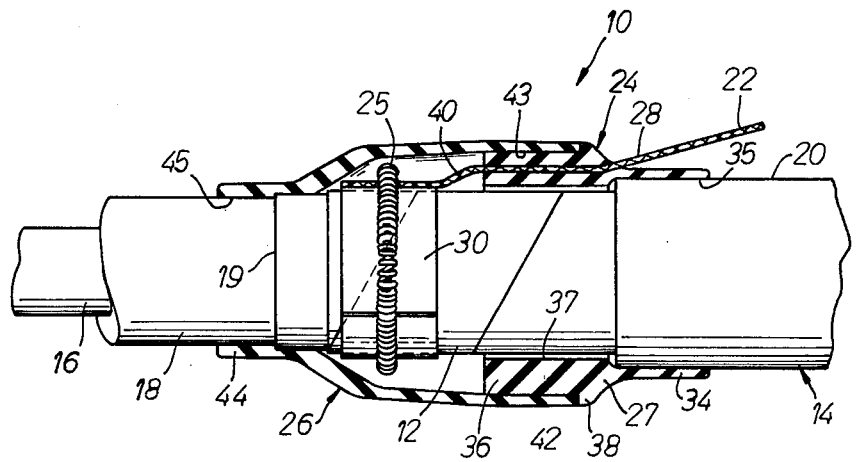
FIG. 2 is a view partly in section showing the adaptor mounted on and connected to the metallic tape whield of the high voltage cable.

The ground contact adaptor 10 according to the present invention is used to provide an external connection to the metallic tape shield 12 of a high voltage cable 14. The high voltage cable 14 of the type contemplated herein includes a conductor 16, an inner cable insulation 18, a conductive shield 19, a metallic tape shield 12 and an outer cable jacket 20. The cable is prepared for termination by removing a section of the outer cable jacket 20 to expose the metallic tape shield 12. A portion of the metallic tape shield 12 is removed to expose a section of the conductive shield 19 which is cut away to expose the inner cable insulation 18. A portion of the inner insulation 18 is removed to expose the conductor 16. After the cable has been prepared for termination, the ground contact adaptor 10 is mounted on the cable 14 to provide the external ground contact 22 for the metallic tape shield 12.

Figure 1:
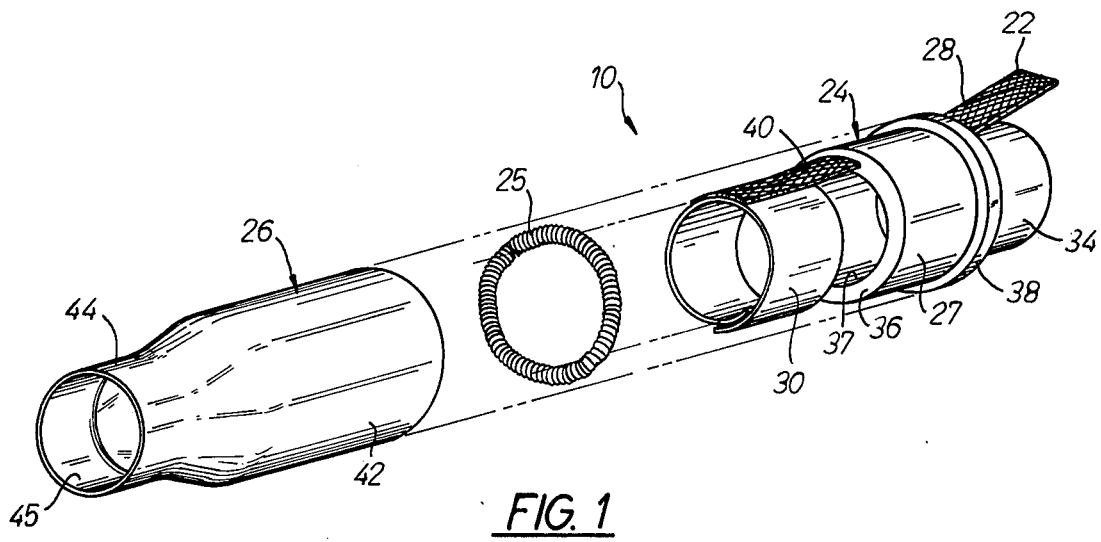
FIG. 1 is an exploded perspective view of the ground contact adapator according to the present invention.

Referring to FIG. 1, the adaptor 10, as shown, generally includes a contact sleeve assembly 24, a spring 25 and a conducting rubber or elastomeric sleeve 26. The adaptor 10 is mounted on the cable 14 by sliding the contact assembly 24 onto the cable. The spring 25 is slipped over the metallic tape shield 12 onto the assembly 24. The conducting rubber sleeve 26, is pushed onto the cable insulation 18 and the assembly 24 to seal the spring 25 within the adapator.

More particularly, the assembly 24 includes a first conducting rubber or elastomeric sleeve 27 having a metallic member 28 molded therein with one end extending outwardly therefrom to form the ground contact 22 and the other end being connected to an electrically conductive copper band 30. The spring 25 is used to bias the band 30 into engagement with the metallic tape shield 12 as described hereinafter.

In this regard, the conducting rubber sleeve 27 includes a first portion 34 having an inside diameter 35 substantially equal to or less than the outside diameter of the outer cable insulation 20 and a second portion 36 having an inside diameter 37 substantially equal to or just greater than the outside diameter of the metallic tape shield 12. Means are provided on the outside diameter of the second portion 36 to form a stop for the sleeve 26 in the form of a flange 38.

The metallic member 28 is molded within the second portion 36 and includes a first section 22 that extends outwardly from the sleeve 27 to provide the external ground connection. The member 28 has an inner section 40 that is secured to the band 30. The member 28 can be formed of a copper braid or strip. The sleeve 27, metallic member 28 and band 30 thereby form a single assembly that is mounted on the end of the cable with the first portion 34 sealingly engaging the outer surface of the jacket 20.

The conductive band 30 has a length greater than the circumference of the metallic tape shield 12 and loosely engages the outer surface of the shield when mounted on the cable. The band 30 is biased into engagement with the shield by means of the spring 25 which allows the band 30 to contact the copper tape shield 12 and to expand the contact with the cable.

Means are provided for sealing the connection of the band 30 to the metallic tape shield 18. Such means is in the form of the second sleeve 26. In this regard, the second sleeve 26 includes a first portion 42 having an inner diameter 43 substantially equal to or less than the outer diameter of the second portion 36 of the assembly sleeve 27. The second sleeve 26 also includes a second portion 44 having an inner diameter 45 substantially equal to or less than the outer diameter of the inner cable insulation 18. The second sleeve 26 is mounted on the cable and pushed into engagement with the flange 38 on the second portion 36 of the sleeve 27. The first portion 42 of the second sleeve 26 will sealingly engage the outer surface of the second portion 36 of the first sleeve and the second portion 44 of the second sleeve will sealingly engage the outer surface of the inner insulation 18 and the conductive shield 19.

In the event the conductive shield 19 extends beyond the end of the second sleeve 26, both the first and second sleeves could then be made of non-conductive insulating material.

It will be obvious to those skilled in the art that the band 30 could be biased into engagement with the copper tape shield 12 by a third portion in the second sleeve 26 having a diameter substantially equal to or less than the diameter of the copper tape shield. Alternatively, the second portion 44 of the second sleeve 26 could be extended to bias band 30 into engagement with copper tape shield 12.

FIG. 3

Figure 3:
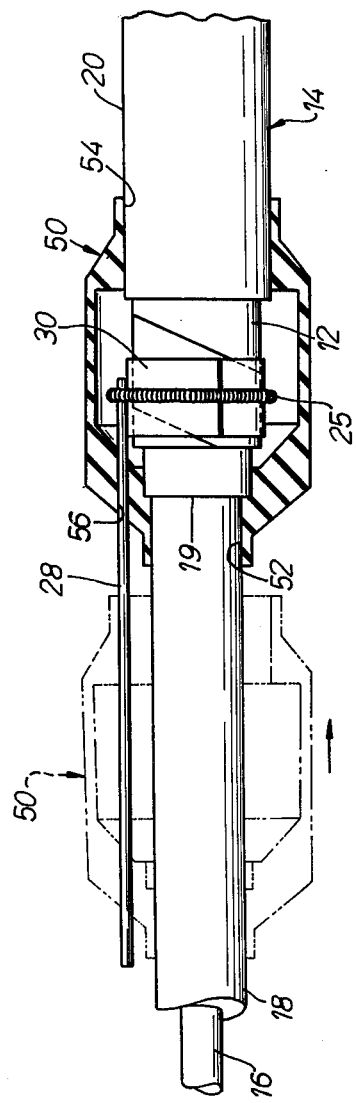
FIG. 3 is a view of an alternate embodiment of the adaptor according to the invention.

In the alternate embodiment of the adaptor shown in FIG. 3, a single elastomeric sleeve 50 is used to enclose the connection of the conductive band 30 to the metallic tape shield 12. In this regard, electrical connection to the metallic tape shield 12 is achieved by the same structure as shown in FIGS. 1 and 2. The conductive copper band 30 is secured to a metallic member 28 in the form of a rod. The band 30 has a length greater than the circumference of the metallic tape shield 12 so that it overlaps when wrapped around the shield 12. The spring 25 is placed on the band 30 to bias the band into electrical engagement with the metallic tape shield 12 as described above.

The connection of the band 30 to the metallic tape shield 12 is enclosed and sealed by means of the elastomeric sleeve 50. The elastomeric sleeve 50 is in the form of a hollow cylindrical tube. The sleeve 50 is provided with a first reduced diameter section 52 at one end and a second reduced diameter section 54 at the other end. The first section 52 has a diameter substantially equal to or less than the diameter of the cable insulation 18. The second section 54 has an inner diameter substantially equal to or slightly less than the diameter of the outer cable jacket 20. An opening 56 is provided in the wall of the sleeve 50 to sealingly engage the metallic member or rod 28.

This adaptor is mounted on the cable by initially placing the band 30 around the metallic tape shield 12. The spring 25 is placed around the band to bias the band into engagement with the metallic tape shield 12. The elastomeric sleeve 50 is positioned on the cable insulation 18 with the metallic member 28 extending through the opening 56 and the first portion 52 of the sleeve sealingly engaging the outer surface of the cable insulation 18. The sleeve 50 is pushed over the copper band 30 until the second portion 54 sealingly engages the outer cable jacket 20. The metallic member 28, since it is fixed to the band 30, will remain stationary as the sleeve is moved over the outer cable jacket 20. The opening 56 is sized to sealingly engage the surface of the rod 28.

The embodiments of the invention in which an exclusive property or privilege is claimed are defined as follows:

1. A ground contact adaptor for a high voltage cabel having a portion of the metallic tape shield exposed for cable termination, said adaptor comprising:
   an elastomeric sleeve,
   an electrically conductive band,
   an electrically conductive member secured to said band and embedded in said sleeve and extending outwardly therefrom for providing an external ground contact,
   means biasing the conductive band into engagement with the metallic tape shield and means enclosing said band and said electrically conductive member.

2. An adaptor according to claim 1 wherein said biasing means comprises a spring ring having a diameter smaller than the diameter of the metallic tape shield.

3. An adaptor according to claim 1 wherein said elastomeric sleeve has a first portion sealingly engaging the outer cable jacket,
   and said enclosing means includes a second elastomeric sleeve having a first portion sealingly engaging the inner cable insulation and a second portion sealingly engaging the first elastomeric sleeve.

4. An adaptor according to claim 1 wherein said member comprises a copper braided strip.

5. An adaptor according to claim 1 wherein said member comprises a copper strip.

6. A ground contact adaptor for a high voltage cable having a metallic tape shield partially exposed for cable termination, said adaptor comprising:
   a first electrically conductive elastomeric sleeve mounted on the cable,
   an electrically conductive band having a length greater than the circumference of the metallic tape shield of the cable,
   an electrically conductive member connected to said band and extending through said first electrically conductive elastomeric sleeve to provide an external ground contact,
   means biasing said band into engagement with the metallic tape shield of the cable,
   and a second electrically conductive elastomeric sleeve mounted on the cable in sealing engagement with the first sleeve to enclose the band.

7. An adaptor according to claim 6 wherein said first sleeve includes:
   a first portion sealingly engaging the cable jacket and a second portion overlying the metallic tape shield,
   and said second electrically conductive elastomeric sleeve including a first portion sealingly engaging the second portion of said first sleeve and a second portion sealingly engaging the cable insulation.

8. A grounding adaptor for use in connection with a high voltage cable of the type having an electrical conductor surrounded by an inner insulation,
   a conducting shield surrounding the insulation,
   a metallic tape shield surrounding the conducting shield and an outer jacket surrounding the tape shield, said adaptor comprising:
   electrical contact means including a band of electrically conductive material having a length greater than the circumference of the metallic tape shield,
   a grounding member connected to said band,
   a ground support sleeve of elastomeric material supporting an intermediate portion of said grounding member and being adapted to be mounted on the cable with a portion of the sleeve sealingly engaging the outer jacket,
   spring means mounted on said band to bias said band into electrical engagement with the metallic tape shield, and an elastomeric sleeve having a first portion sealingly engaging said support sleeve and a second portion sealingly engaging the conducting shield surrounding the cable insulation whereby a water-tight seal is formed around said band.

9. A ground contact adaptor for a high voltage cable having a portion of the metallic tape shield exposed for cable termination, said adaptor comprising:
an electrically conductive band adapted to be mounted on the metallic tape shield,
an electrically conductive member secured to said band for providing an external ground contact,
means for biasing said conductive band into engagement with the metallic tape shield,
and means for enclosing the exposed portion of the metallic tape shield to seal the connection of the conductive band with the metallic tape shield.

10. The adaptor according to claim 9 wherein said enclosing means includes a first elastomeric sleeve having a first portion sealingly engaging the outer cable jacket and a second elastomeric sleeve having a first portion sealingly engaging the inner cable insulation and a second portion sealingly engaging the first elastomeric sleeve.

11. The ground contact adaptor according to claim 9 wherein said enclosing means comprises an elastomeric sleeve having a first portion for sealingly engaging the cable insulation and a second portion for engaging the outer cable jacket.

12. The adaptor according to claim 9 wherein said biasing means comprises a spring ring having a diameter smaller than the diameter of the metallic tape shield.

13. The adaptor according to claim 11 wherein said elastomeric sleeve includes an opening for sealingly engaging said conductive member.

* * * * *